US009450411B2

United States Patent
Chen et al.

(10) Patent No.: US 9,450,411 B2
(45) Date of Patent: Sep. 20, 2016

(54) METHOD, APPARATUS AND SYSTEM FOR SUPPRESSING LOW FREQUENCY OSCILLATION IN POWER SYSTEM

(75) Inventors: Gesong Chen, Beijing (CN); Xiaoxin Zhou, Beijing (CN); Ruihua Song, Beijing (CN)

(73) Assignee: State Grid Corporation of China, Beijing (CN)

(*) Notice: Subject to any disclaimer, the term of this patent is extended or adjusted under 35 U.S.C. 154(b) by 735 days.

(21) Appl. No.: 13/881,577

(22) PCT Filed: Oct. 14, 2011

(86) PCT No.: PCT/CN2011/080778
§ 371 (c)(1),
(2), (4) Date: Jun. 18, 2013

(87) PCT Pub. No.: WO2012/055322
PCT Pub. Date: May 3, 2012

(65) Prior Publication Data
US 2013/0257166 A1    Oct. 3, 2013

(30) Foreign Application Priority Data

Oct. 26, 2010    (CN) .......................... 2010 1 0519814

(51) Int. Cl.
*H02J 3/24*        (2006.01)

(52) U.S. Cl.
CPC ....................................... *H02J 3/24* (2013.01)

(58) Field of Classification Search
CPC ................ H02J 3/24; H02J 3/26; H02J 3/34; H02J 3/38; H02J 2003/365
See application file for complete search history.

(56) References Cited

FOREIGN PATENT DOCUMENTS

| CN | 201146389 Y | 11/2008 |
|----|---|---|
| CN | 101465550 A | 6/2009 |
| JP | 6319228 A | 11/1994 |

OTHER PUBLICATIONS

Piwko et al., Variable Frequency Transformer—A New Alternative for Asynchronous Power Transfer, 2005 IEEE, pp. 393-398.*

(Continued)

*Primary Examiner* — Toan Le
(74) *Attorney, Agent, or Firm* — The Webb Law Firm

(57) ABSTRACT

A method, apparatus and system for suppressing low frequency oscillation in a power system. The method includes determining a system transfer function of an interconnected power system section in which a variable frequency transformer (VFT) is located; determining a damping controller parameters according to the system transfer function; and suppressing low frequency oscillation of the power system by means of the VFT based on the damping controller parameter. The objects of the method, apparatus and system are definite: optimizing the damping controller parameter can be achieved by simply tracking and analyzing the response of the system to disturbance, without the need to understand the configuration and parameters of the system or solve complicated power system equations, which has a better effect in suppressing low frequency oscillation in the power system and is advantageous for improving the safety and stability level of the power grid.

14 Claims, 8 Drawing Sheets

(56) References Cited

OTHER PUBLICATIONS

Ghasemi et al., Validation of a STATCOM Transient Stability Model through Small-Disturbance Stability Studies, 2007 IEEE, pp. 1-6.*

Chen et al., Design of Self-adaptive Damping Controller to Low Frequency Power Oscillation in Interconnected Power Systems Based on Variable Frequency Transformer, Proceedings of the CSEE, Jun. 5, 2011, pp. 1-7, vol. 31, No. 16, English-language Abstract included.

* cited by examiner

METHOD, APPARATUS AND SYSTEM FOR SUPPRESSING LOW FREQUENCY OSCILLATION IN POWER SYSTEM

TECHNICAL FIELD

This invention mainly relates to the field of the safety operation and control of power systems, particularly, to a method, apparatus and system for suppressing low frequency oscillation in power systems.

BACKGROUND

Large power grid interconnection is an essential trend in the development of power grids all over the world, which however may lead to the problem of low frequency power oscillation at oscillation frequencies from 0.1 Hz to 2.0 Hz in general. If the oscillation mode has a weak damping or even negative damping, it may cause grid instability and endanger grid security.

In the 1960s, low frequency power oscillation happened in North America power systems. Since 1980s, with the increased percentage of large generator units with fast excitation systems and large-scale power grid interconnection, low frequency oscillation phenomena occurred in China's power grids, for example, in Hunan power systems in 1983, in the tie-lines of the Guangdong-Hong Kong interconnection system in 1984 and 1985, in the interconnection system of the China Southern power grid system in 1994, in the Ertan power transmission system of the Sichuan-Chongqing power grid in 1998 and 2000, in China Southern-Hong Kong AC/DC power transmission system in 2003, etc. How to suppress low frequency oscillation of interconnected system is an important issue to be solved for large power grid interconnection.

Currently, the following measures are practically adopted in projects to suppress low frequency oscillation in power systems:

1. Adding power system stabilizers in generator excitation systems to suppress power system low frequency oscillation, which is a measure commonly adopted in power systems of China at present.

2. Applying HVDC power regulation to suppress low frequency oscillation in power systems. For HVDC transmission system or AC/DC hybrid systems, a low frequency power oscillation damping module may be added in a HVDC control system to increase system damping for the potential low frequency oscillation mode.

3. Adopting FACTS devices, for example, thyristor controlled series compensator (TCSC), static var compensator (SVC) may be used to suppress low frequency oscillation in power systems. For example, TCSC is installed at the tied line between the Brazil's northern and southern power grids, which suppress low frequency oscillation by TCSC impedance control.

However, the above measures are limited. Adding power system stabilizers in generator excitation systems to suppress power system low frequency oscillation is limited in that: (1) because a power system has a large amount of generators widely distributed, providing a power system stabilizer for each generator needs a lot of works; (2) in practical operation, the power system stabilizers of some power plants may out of operation due to management or technical reasons, as a result, damping effects may be decreased; (3) the parameter designs of power system stabilizers must be coordinated with each other and adapted to different configuration of power systems If the configuration of the power system or operation mode of generators has been changed significantly, the effects of the power system stabilizer with preset designed parameters may be limited for suppressing the low frequency oscillation.

Applying HVDC regulation function or adopting FACTS devices such as TCSC or SVC to damp low frequency oscillation, these devices must be installed in the power systems. Meanwhile, TCSC and SVC are devices based on impedance adjustment or reactive power adjustment, which are indirect measures to suppress active power oscillation, and are affected by system configuration apparently.

In summary, in order to adapt to the new trend of large power grid interconnection, innovative solutions to dynamically recognize the low frequency oscillation mode of power system, design, measures and devices of the controller are desired.

SUMMARY

A technical problem to be addressed in this invention is to provide a method for suppressing low frequency oscillation in power systems, which is adapting to dynamic systems and with low computing complexity.

A method for suppressing low frequency oscillation in a power system is provided in this invention, comprising: determining a system transfer function at a cross-section of the interconnected power system, where a variable frequency transformer (VFT) locates; determining damping controller parameters according to the system transfer function; suppressing low frequency oscillation in the power system by means of VFT based damping controller and its optimized parameters.

According to an embodiment of the method for suppressing low frequency oscillation in a power system of this invention, determining a system transfer function at a cross-section of the interconnected power system comprises: applying a power disturbance with a VFT at the cross-section of the interconnected power system where the VFT locates; measuring a power response under the power disturbance at the cross-section of the interconnected power system where the VFT locates; determining the system transfer function using a Prony method according to the power response.

According to an embodiment of the method for suppressing low frequency oscillation in a power system of this invention, applying a power disturbance with a VFT at the cross-section of the interconnected power system where the VET locates comprises: applying a square-wave power disturbance through the VFT at the cross-section of the interconnected power system where the VFT locates.

According to an embodiment of the method for suppressing low frequency oscillation in a power system of this invention, determining damping controller parameters according to the system transfer function comprises: determining damping controller parameters according to the system transfer function using a root locus method and phase compensation method.

According to an embodiment of the method for suppressing low frequency oscillation in a power system of this invention, after determining damping controller parameters, the method further comprises: applying a power disturbance with the VFT at the cross-section of the interconnected power system where the VFT locates to optimize the damping controller parameters.

According to an embodiment of the method for suppressing low frequency oscillation in a power system of this invention, the damping controller comprises a DC-blocking module and a phase lead/lag compensation module.

According to an embodiment of the method for suppressing low frequency oscillation in a power system of this invention, it determines the damping controller parameters according to the system transfer function, and the damping controller parameters can be adjusted in time only through tracing and analyzing a system response to a disturbance. It adapts to dynamic system, without knowledge about particular system structures and parameters, with no need to solve complex power system equations, and has the advantaged of lower computing complexity and higher operability.

An apparatus for suppressing low frequency oscillation in a power system is provided in this invention, comprising a damping controller and further: a transfer function determining unit for determining a system transfer function at a cross-section of the interconnected power system; a damping parameter determining unit for determining damping controller parameters according to the system transfer function.

According to an embodiment of the apparatus for suppressing low frequency oscillation in a power system of this invention, the transfer function determining unit comprises a power disturbance applying module for applying a power disturbance with a VFT at the cross-section of the interconnected power system where the VFT locates; a power response determining module for measuring a power response under the power disturbance at the cross-section of the interconnected power system where the VFT locates; a transfer function determining module for determining the system transfer function using a Prony method according to the power response.

According to an embodiment of the apparatus for suppressing low frequency oscillation in a power system of this invention, the power disturbance applying module applies a square-wave power disturbance through the VFT at the cross-section of the interconnected power system where the VFT locates.

According to an embodiment of the apparatus for suppressing low frequency oscillation in a power system of this invention, the damping parameter determining unit determines damping controller parameters according to the system transfer function using a root locus method and phase compensation method.

According to an embodiment of the apparatus for suppressing low frequency oscillation in a power system of this invention, further comprising a damping parameter optimization unit for applying a power disturbance with the VFT at the cross-section of the interconnected power system where the VFT locates to optimize the damping controller parameters.

According to an embodiment of the apparatus for suppressing low frequency oscillation in a power system of this invention, the damping controller comprises a DC-blocking module and a phase lead/lag compensation module.

A system for suppressing low frequency oscillation in a power system is further provided in this invention, comprising: a VFT and the above apparatus for suppressing low frequency oscillation in a power system.

According to the apparatus and system for suppressing low frequency oscillation in a power system of this invention, it determines the system transfer function by the transfer function determining unit and determine damping controller parameters by the damping parameter determining unit. It can adjusted and optimized damping controller parameters only by tracing and analyzing the system response to the disturbance. This adapts to dynamic system, without knowledge about particular system configuration and parameters, with no need to solve complex power system equations, and has lower computing complexity and higher operability.

DETAILED DESCRIPTION

A more complete description of this invention will be given below with reference to the accompanying drawings, in which exemplary embodiments of this invention are illustrated.

The emergence of VFT provides a new option of low frequency oscillation suppression. The core components of a VFT comprise a rotary transformer having single-phase windings on both the stator and rotor sides, wherein a DC motor driving system is used to adjust the phase shift of the rotor field relative to the stator field, and control the magnitude and direction of the power outputted from the VET. The technical solution of this invention uses the power adjustment capability of a VFT to suppress low frequency oscillation. The working principle of the VFT as a device for suppressing low frequency oscillation is to dynamically adjust the power on a tie-line or cross-section with the VFT to increase low frequency damping of the system for suppressing low frequency oscillation.

Figure 1:
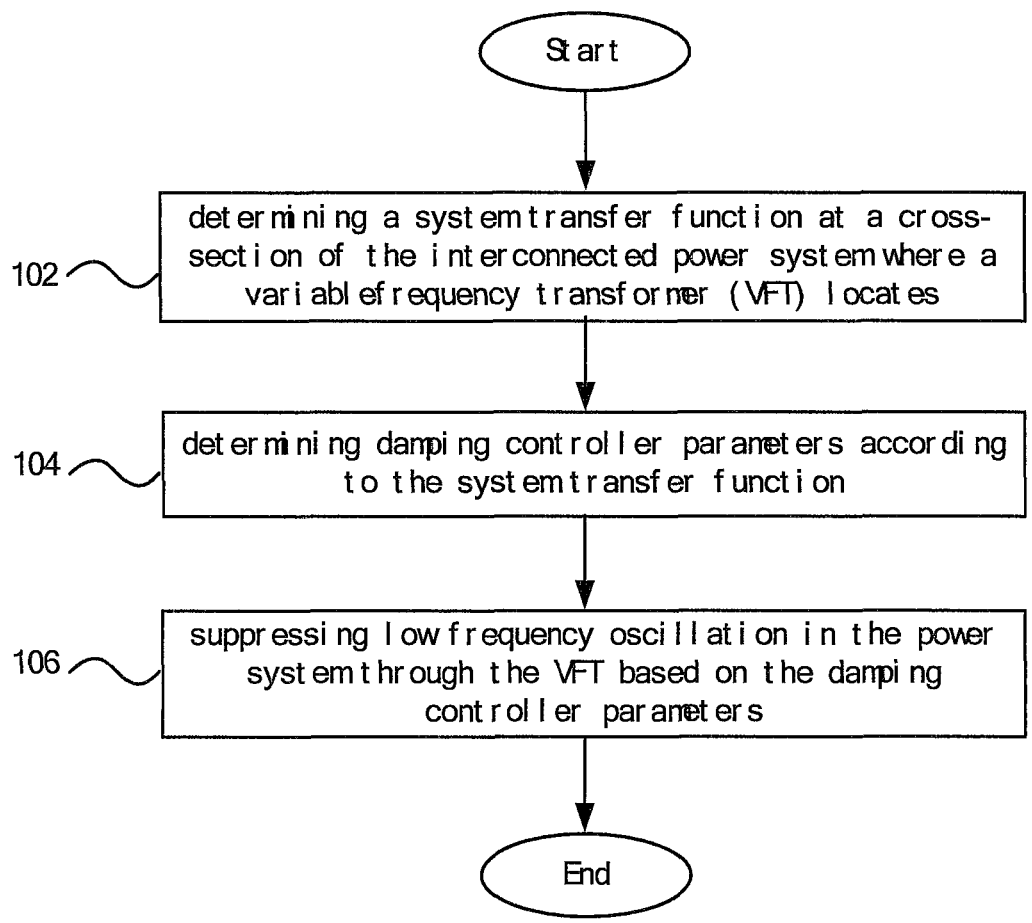
FIG. 1 shows a flowchart of a method for suppressing low frequency oscillation in a power system according to an embodiment of this invention.

FIG. 1 shows a flowchart of a method for suppressing low frequency oscillation in a power system according to an embodiment of this invention.

As shown in FIG. 1, at step 102, a system transfer function at a cross-section of the interconnected power system where the VFT locates is determined.

At step 104, damping controller parameters of the VFT are determined based on the determined system transfer function.

At step 106, low frequency oscillation in the power system is suppressed with the VFT based on the damping controller parameters.

In the above embodiment, technical characteristics of the novel grip interconnection apparatus VFT are sufficiently exploited to suppress low frequency oscillation using the power adjustment capability of the VFT. Different to PSS distributed at various power stations to suppress low frequency oscillation, the VFT mainly control a certain cross-section, with a clear control object and target. The technical solution of this disclosure breaks the limitations of power system stabilizers functioning as a distributed low frequency oscillation resolution method, and can solve the main modes of low frequency oscillation between interconnected systems in a centralized manner; overcome the limitation of TCSC and SVC which are significantly affected by system configuration in low frequency oscillation suppression.

Figure 2:
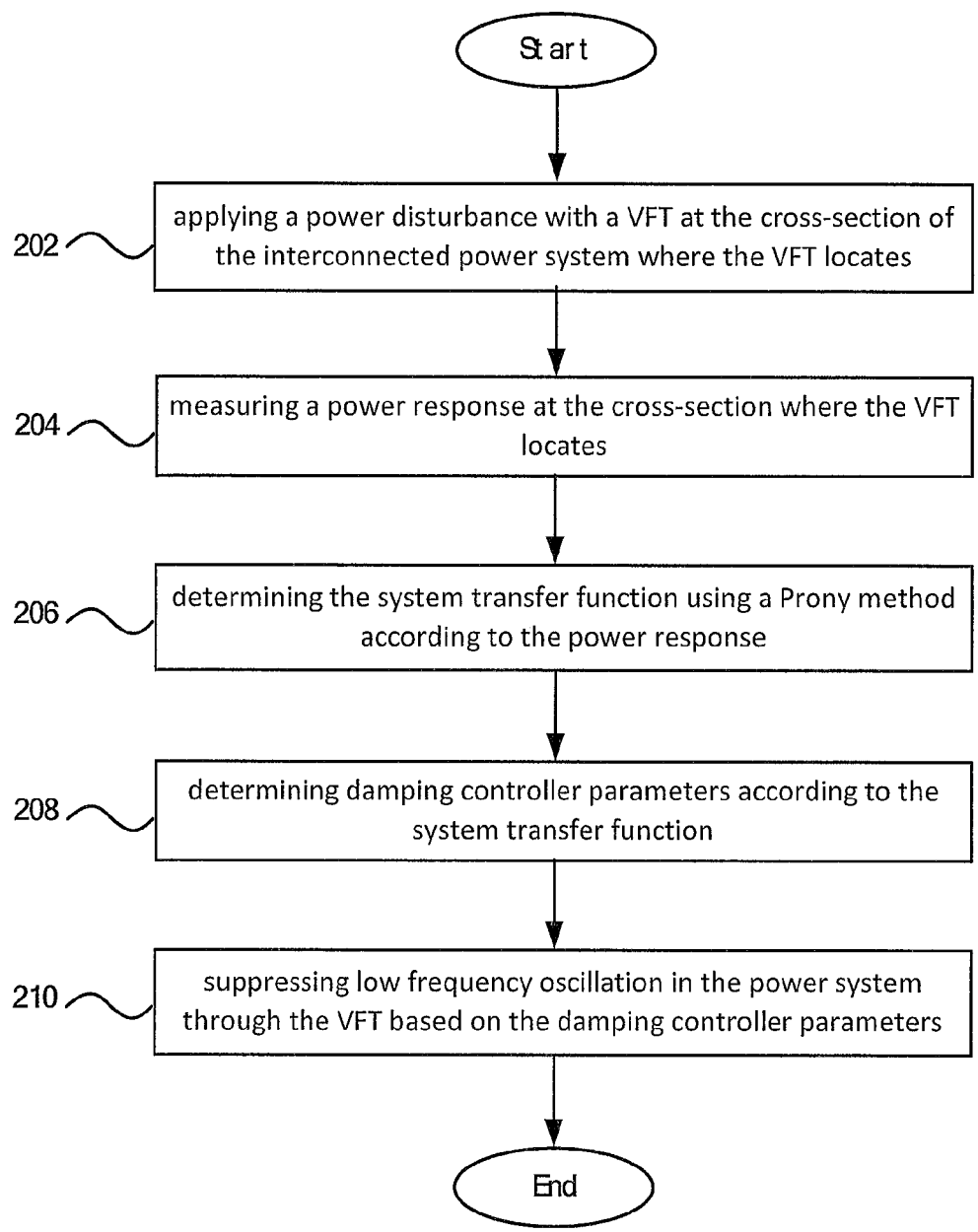
FIG. 2 shows a flowchart of a method for suppressing low frequency oscillation in a power system according to another embodiment of this invention.

FIG. 2 shows a flowchart of a method for suppressing low frequency oscillation in a power system according to another embodiment of this invention.

As shown in FIG. 2, at step 202, a power disturbance is applied with the VFT at a cross-section of the interconnected power system where the VFT locates. For example, a square-wave power disturbance is applied with the VFT at a cross-section of the interconnected power system where the VFT locates.

At step 204, a power response to such a power disturbance at the cross-section of the interconnected power system where the VFT locates is measured.

At step 206, a system transfer function is determined according to the power response based on a Prony method. The Prony method is a signal processing method for fitting uniformly sampled data with a linear combination of exponential functions, which can be used to parse the characteristics of the measured signal, such as frequency, attenuation factor, amplitude, and phase.

At step 208, a damping controller parameter of the VFT is determined according to the determined system transfer function.

At step 210, low frequency oscillation in the power system is suppressed with the VFT based on the damping controller parameter.

Through using the power adjustment capability of the VFT, the design of the damping controller tightly depends on the system. Traditional damping controller parameter designs generally employ a system eigenvalue analysis method, in which oscillation modes of the power system are calculated with a static offline power system eigenvalue analysis method according to the configuration and parameters of the system, to design an appropriate damping controller parameter. The eigenvalue analysis method needs knowledge about the configuration and main element parameters of the system, and has a large amount of computation and a large amount of basic data to be collected. Meanwhile, the configuration of the system and its generators operation manner may vary frequently, which further increases the difficulty in traditional damping controller parameter design. The eigenvalue analysis method has poor adaptability to actual grid structure variations, and thus cannot be adapted to dynamic system variations to design a more reasonable damping controller parameter.

In the above embodiment, with the Prony method, a transfer function can be derived in a better manner for a system disturbance response without the need of eigenvalue resolution, which is more suitable for bulk system low frequency oscillation research with complex variations. The power adjustment capability of the VFT provides a new tool for suppressing low frequency oscillation in an interconnected system. Through a stepped power adjustment of the VFT, a disturbance is added in the system to provide a favorable condition for the Prony method. A damping controller parameter can be automatically calculated and optimized through incorporating the VFT and the Prony method, so that an adaptive damping controller for suppressing low frequency oscillation in a power system can be constructed.

How to determine the system transfer function according to the input output signals will be particularly described below.

For a Single Input Single Output (SISO) linear system, assume that its transfer function is in the following form.

$$G(s) = \sum_{i=1}^{n} R_i/(s-\lambda_i) \tag{1}$$

Given an input signal I(s), through sampling output signal, an output response Y(s) can be fitted with for example the Prony method:

$$Y(s)=G(s)I(s) \tag{2}$$

Wherein, Y(s) and I(s) are formed as the sum of a series of delay signals, respectively. According to the known Y(s) and I(s), and of G(s) can be calculated.

Using a square pulse signal as the input signal can simplify the calculation. VFT has a better step control capability, by which through applying a power step adjustment command by the VFT, a response to a flow variation at a cross-section can be measured, then a system response function Y(s) can be identified with, for example, the Prony method, and in turn a transfer function G(S) between the input signal and the output signal can be obtained.

How to design the damping controller parameters according to the determined transfer function will be described below.

Figure 3:
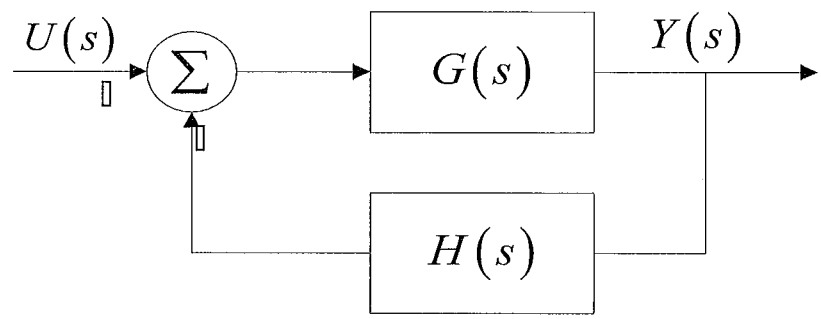
FIG. 3 shows a schematic diagram of a feedback control structure according to an embodiment of this invention.

FIG. 3 shows a schematic diagram of a feedback control structure according to an embodiment of this invention. As shown in FIG. 3, G(s) and H(s) are an open-loop transfer function and a feedback element respectively. A close-loop transfer function of the system shown in FIG. 3 is:

$$G_L(s)=G(s)/(1-G(s)H(s)) \tag{3}$$

The characteristic equation of the close-loop system is:

$$G(s)H(s)=1 \tag{4}$$

Figure 4:
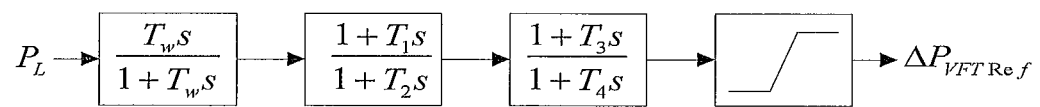
FIG. 4 shows a schematic diagram of an example of a damping control reference structure.

FIG. 4 shows a schematic diagram of an example of a damping control reference structure in the VFT for suppressing low frequency oscillation. Note that, those skilled in the art may understand the number of control modules in the damping controller can be adjusted as required. In FIG. 4, the active power at a controlled cross-section is used as the input of the damping controller, an increment in a transmission power command can be obtained from the DC-blocking and phase shift elements to adjust the transmission power of the VFT to achieve the objective of suppressing power oscillation.

In the case of a determined block diagram of the damping controller, a critical step is to design parameters of the damping controller. After obtaining the above transfer function parameter, damping controller parameters can be determined using, for example, a root locus method and phase compensation method. The root locus method and phase compensation method moves the dominant pole of the system to a specific position on the S plane through a feedback control step.

For an expected close-loop system, characteristic equation of the close-loop system:

$$G(\lambda_d)H(\lambda_d)=1 \quad (5)$$

The feedback step satisfies at the following amplitude and phase angle conditions:

$$\begin{cases} |H(\lambda_d)| = \dfrac{1}{|G(\lambda_d)|} \\ \text{angle}[H(\lambda_d)] = -\text{angle}[G(\lambda_d)] \end{cases} \quad (6)$$

If the transfer function G(s) is known, using equation (6), the amplitude and phase angle of the feedback step can be determined at a dominant frequency With the feedback control structure shown in FIG. 4, parameters related to the damping controller can be further derived according to an expected damping ratio and a given controller block diagram.

Figure 5:
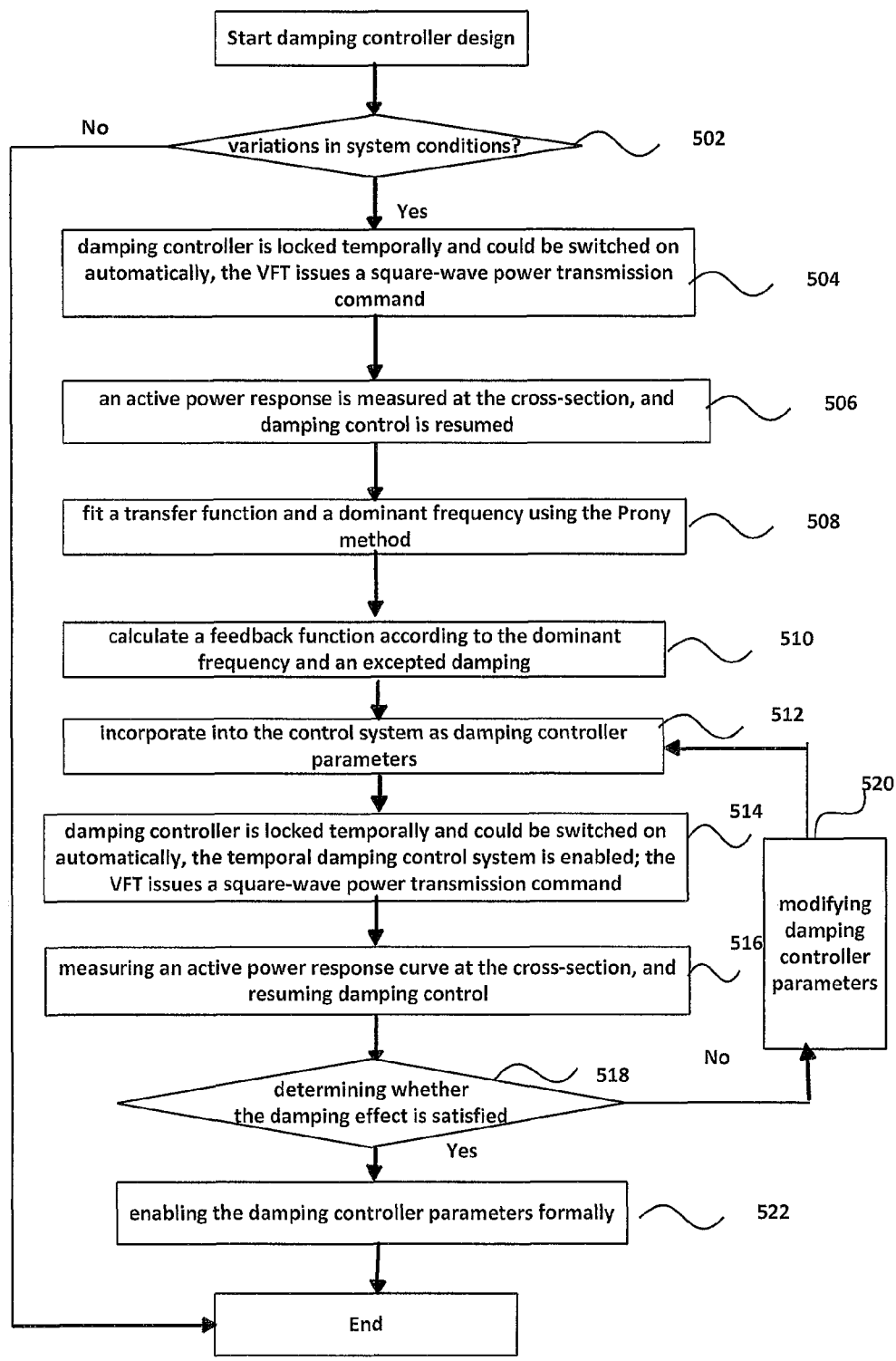
FIG. 5 shows a flowchart of a method for suppressing low frequency oscillation in a power system according to another embodiment of this invention.

FIG. 5 shows a flowchart of a method for suppressing low frequency oscillation in a power system according to another embodiment of this invention.

As shown in FIG. 5, at step 502, it is determined whether the system condition has varied. If so, the flow continues with step 504; otherwise, the flow continues in its original sequence.

At step 504, the damping controller is locked temporally and a reserved device automatically switches on, with the stepped power control capability of the VFT, an approximate square-wave power disturbance is applied at a cross-section of the interconnected system.

At step 506, an active power response is measured at the cross-section, and damping control is resumed.

At step 508, the measured power response is analyzed using the Prony method to calculate a main oscillation mode, a damping ratio and other parameters of the system, and then a system transfer function G(s) is derived.

At step 510, after obtaining the above transfer function parameters, according to the feedback control structure shown in FIG. 3, for a given damping controller block diagram (for example, formed by a DC-blocking module and a phase lead/lag compensation module shown in FIG. 4), with a root locus method and phase compensation method, a parameter H(s) of the damping controller is determined, and then an amplitude and a phase angle at a dominant low frequency oscillation frequency At step 512, the determined damping controller parameter is accepted by the control system.

At step 514, in the case of putting the newly designed damping controller into operation, an approximate square-wave power disturbance is applied with the VFT.

At step 516, an active power response is measured at the cross-section, and damping control is resumed.

At step 518, it is determined whether a satisfied damping effect has been produced. If not, the flow continues with step 520; otherwise, the suppression meets an expected objective, and the flow continues with step 522.

At step 520, damping controller parameters are changed and the flow continues with step 512.

At step 522, the damping controller parameters are definitely determined. After the effect of suppressing low frequency power oscillation of the damping controller is verified, the damping controller can be put into operation formally.

In the case that the system has a significant change in its structure, controller parameters can be automatically optimized according to the above steps.

Figure 6:
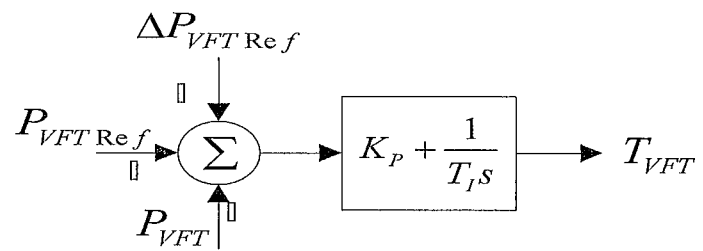
FIG. 6 shows a block diagram of an example of a VFT controller.

In the design of the damping controller for suppressing low frequency oscillation of the VFT, an active power at a cross-section is used as an additional input signal. The block diagram of the VFT controller is shown in FIG. 6, when the damping controller is activated and when low frequency oscillation occurs, the system automatically provides a power oscillation increment. The output of the damping controller is a given transmission power increment of the VFT $_{VFTref}$, which is added to a given power$_{VFTref}$ of the VFT in its regular transmission to get a given transmission power$_{VFTref}$ required for suppressing power oscillation, so as to compensate the power oscillation increment and produce an effect of suppressing transmission power oscillation on the tie-line.

The technique of this disclosure mainly relates to the safe operation and control of a power system and a solution of suppressing low frequency oscillation between interconnected power systems, wherein the design of a damping controller for suppressing low frequency oscillation in the power system, the automatic optimization of damping controller parameters and a power apparatus for realizing the corresponding functions are researched, to improve the safe level of the power system and its capability of networked power transmission. In practice, to solve the problem of low frequency oscillation, it is necessary to adapt continuous variations in the structure of the power system, its configuration and generators operation condition, identify system oscillation modes accurately, to damp low frequency oscillation with related system devices. With the technical solution of the above embodiment, the limitation of mode recognition depending on the system structure, parameters in the design of the damping controller is broken through, by means of the adjustment capability of the VFT and related digital signal analysis methods, main low frequency oscillation modes and damping characteristics of an interconnected system can be calculated in an adaptive manner, and the adaptability and suppression effect of the damping controller can be enhanced.

In summary, with the above method and approach, a new optional solution for suppressing low frequency power oscillation in a power system is provided, capable of being adapted to constantly varied system conditions, requiring no knowledge about the particular structure and parameters of the system, preventing PSS design in a large-scaled and distributed manner, and enabling the suppression of low frequency power oscillation in a damp-interconnected system effectively.

Figure 7:
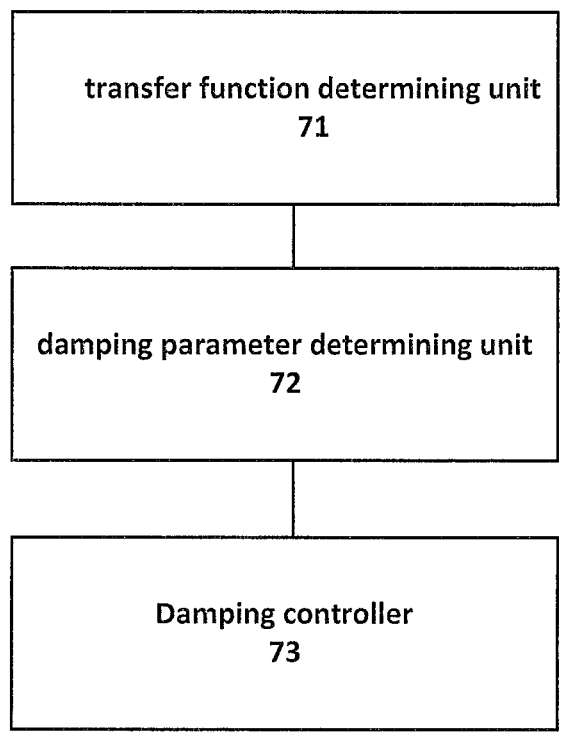
FIG. 7 shows a structure view of an apparatus for suppressing low frequency oscillation in a power system according to an embodiment of this invention.

FIG. 7 shows a structure view of an apparatus for suppressing low frequency oscillation in a power system according to an embodiment of this invention. According to FIG. 7, the apparatus comprises a transfer function determining unit 71, a damping parameter determining unit 72 and a damping controller 73. Wherein, the transfer function determining unit 71 is used to determine a system transfer function at a cross-section of the interconnected power system where a VFT locates; the damping parameter determining unit 72 is used to determine damping controller parameters according to the system transfer function determined by the transfer function determining unit 71. For example, the damping parameter determining unit 72 determines damping controller parameters according to the system transfer function using a root locus method and phase compensation method. According to an embodiment of this invention, the damping controller 73 comprises a DC-blocking module and a phase lead/lag compensation module, for example, with the reference structure shown in FIG. 4.

In the above embodiment, through determining the system transfer function by the transfer function determining unit and determining damping controller parameters by the damping parameter determining unit, damping controller parameters can be adjusted in time only through tracing and analyzing a system response to a disturbance, to adapt to variations of a dynamic system, without knowledge about the particular structure and parameters of the system, with no need to solve complex power system equations, and thus having lower computing complexity.

Figure 8:
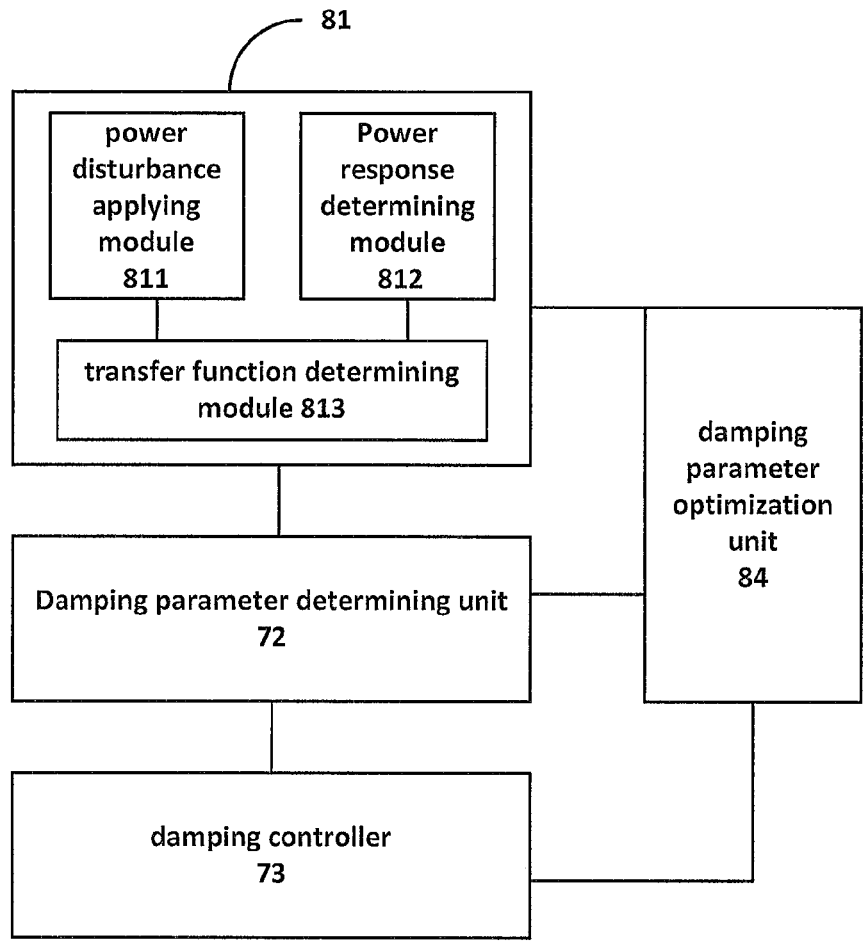
FIG. 8 shows a structure view of an apparatus for suppressing low frequency oscillation in a power system according to another embodiment of this invention.

FIG. 8 shows a structure view of an apparatus for suppressing low frequency oscillation in a power system according to another embodiment of this invention. As shown in FIG. 8, the transfer function determining unit 81 comprises a power disturbance applying module 811, a power response determining module 812, and a transfer function determining module 813. The power disturbance applying module 811 applies a power disturbance at a cross-section of the interconnected power system where a VFT locates. For example, the power disturbance applying module 811 applies a square-wave power distribution at the cross-section of the interconnected power system where the VFT locates. The power response determining module 812 measures a power response to the power disturbance at the cross-section of the interconnected power system where the VFT locates; the transfer function determining module 813 determines a system transfer function based on the Prony method according to the power response. According to an embodiment of this invention, optionally, the apparatus further comprises a damping parameter optimization unit 84. The damping parameter optimization unit 84 applies a power disturbance on a tied-line at the cross-section of the interconnected power system where the VFT locates to optimize the damping controller parameters.

In the above embodiment, using the Prony method, the transfer function determining module can figure out a transfer function for the system disturbance response in a better manner without resolving eigenvalues, which is more suitable for the study of low frequency oscillation in bulk systems with complex variations. The power adjustment capability of the VFT provides a new tool for suppressing low frequency oscillation in an interconnected system. Through a stepped power adjustment of the VFT, a disturbance is added in the system to provide a favorable condition for the Prony method. A damping controller parameter can be automatically calculated and optimized through incorporating the VFT and the Prony method, so that an adaptive damping controller for suppressing low frequency oscillation in a power system can be constructed.

Below, the method and apparatus of the technical solution of this invention will be described in detail with a specific example.

Hereinafter, a description will be given with a typical 4-machine system shown in FIG. 9. The system has an inter-area oscillation mode of 0.5 Hz, an increasing oscillation in a system simulation. In order to improve the damping capability of low frequency oscillation of the system, a VFT is provided on single circuit lines between bus B6 and bus B7. A system simulation model is established using the Power System Analysis Software Package. A disturbance with an increment of 0.1 pu and a width of 0.1 s is applied on the VFT, and a system response shown by the dashed line in FIG. 10 is obtained. An oscillation mode, a damping coefficient and an open-loop transfer function shown in table 1 are obtained from the above method, and a fitted curve shown by the solid line in FIG. 10 is given for verification. It is demonstrated by the analysis result that an increasing oscillation mode of 0.5 Hz exists in the system, which is adverse to the safe of the system.

The damping controller has the structure shown in FIG. 4. The dominant pole of the close-loop system is selected as, according to the root locus method and phase compensation method of Section 3, the parameters of the damping controller are determined as.

Figure 9:
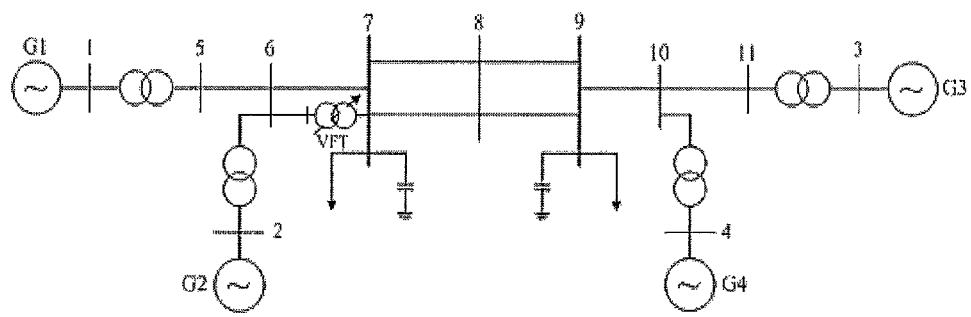
FIG. 9 shows a system view of an example of a typical 4-machine system.
Figure 10:
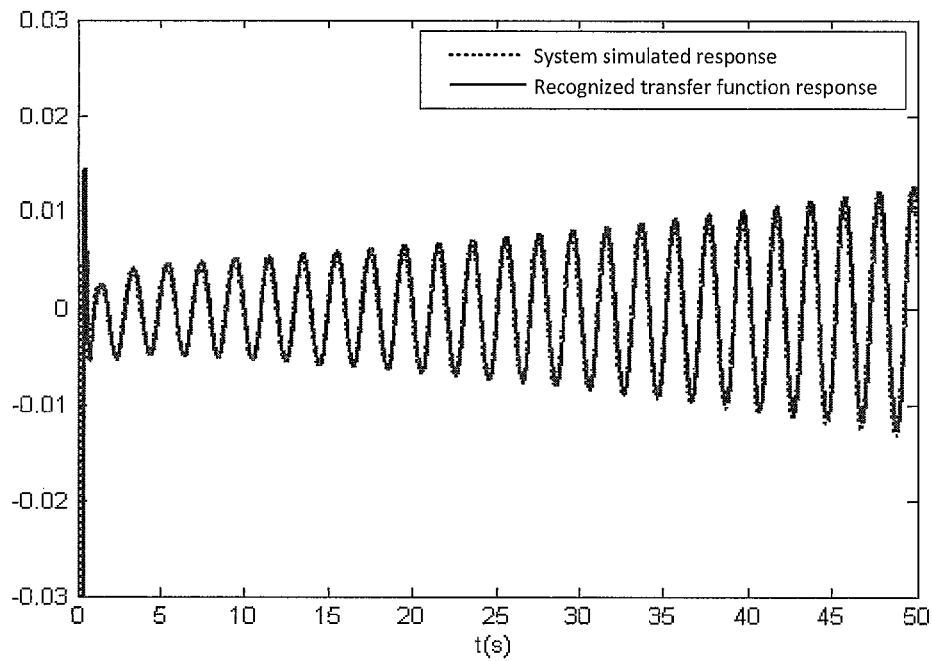
FIG. 10 shows the comparison between a system response and a Prony identification fitting function.
Figure 11:
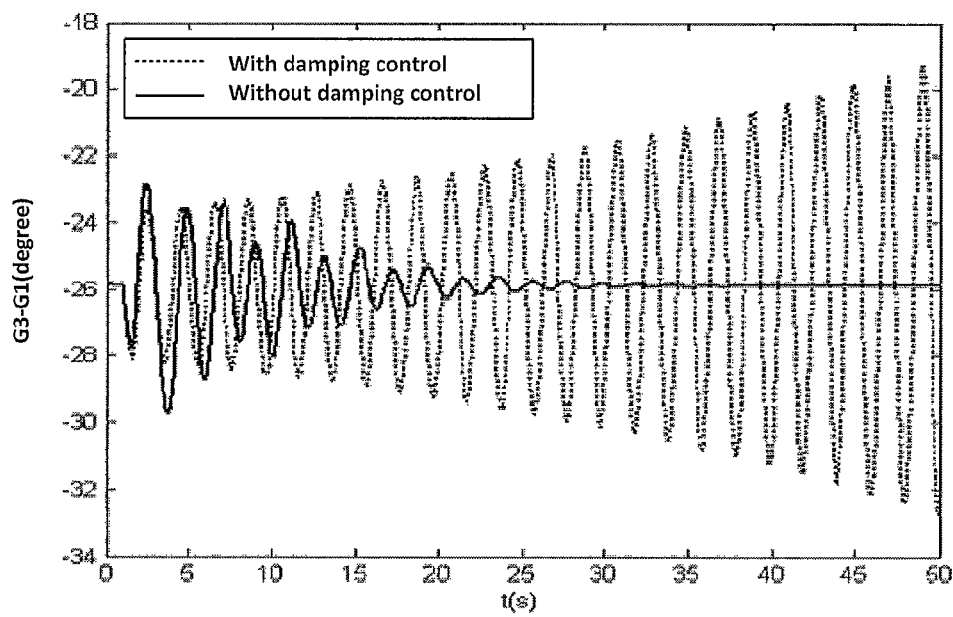
FIG. 11 shows the effects of damping control applied to the typical 4-machine system.

For the system shown in FIG. 9, damping control is incorporated into the control system of the VFT, with a complete control block diagram shown in FIG. 6. Assume that a single-phase transient fault of 0.1 s occurs between the system's AC lines B8-B9. Simulation results of having damping control and having no damping control are compared in FIG. 11, it is shown from analysis that the negative damping ratio −0.007 of the system for a 0.5 Hz mode is increased to a satisfied positive damping ratio 0.05; a damping ratio 0.05 of the system for a 1 Hz mode is increased to 1.07. It can be seen that through the additional damping control of the VFT, system damping of low frequency oscillations is increased, producing an observable suppression effect, no matter for an inter-area oscillation mode or an intra-area oscillation mode.

Figure 12:
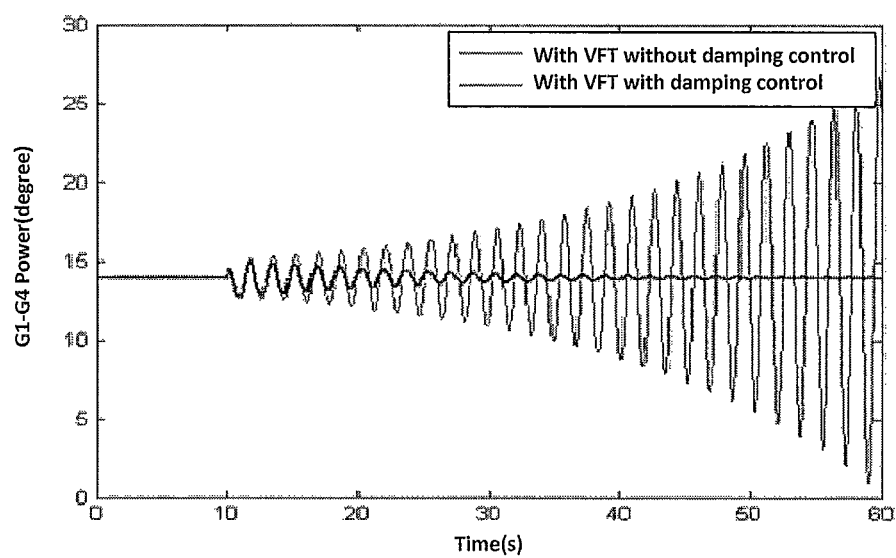
FIG. 12 shows the effects of damping control applied to the typical 4-machine system when G3 is lost.

In a typical 4-machine system, the oscillation mode of the system changes when generator G3 is out of operation, and it is required to derive new damping controller parameters, which can be obtained according to the above method. Likewise, a single-phase transient fault of 0.1 s occurs between B8 and B9, and a comparison of simulation results with damping control and without damping control is shown in FIG. 12, from which the effect of the damping controller can be observed clearly. It is shown from a simulation result of a 4-machine system having varied structures and parameters and practical complicated systems that the adaptive damping controller based on a VFT and the Prony method has better system adaptability, which may produce an apparent damping effect, and thus is beneficial to improve power grid stability.

Low frequency power oscillation is a critical factor that may currently affect the safe operation of bulk systems. This invention provides an effective method for suppressing low frequency oscillation. It is shown by the simulation result of different kinds of systems with varied structured and parameters (FIG. 11 and FIG. 12) and a simulation study of the China's Northeast-North China-Central China super large interconnected power grid system that the system power damping controller designed in this invention has an explicit control objective, with no need of finding out the particular structure and parameters of the system and solving complex power system equations, capable of adjusting damping controller parameters in time only through tracing the system response to a disturbance, having a better effect of suppressing low frequency oscillation, and is beneficial to improve the safe and stability of a power grid.

Note that the idea and principle of low frequency damping control design introduced in this invention is also suitable for applications of suppressing low frequency power oscillation in DC/AC hybrid systems, such as DC power modulation; the interconnected system introduced in this invention comprises not only synchronized power systems, but also systems connected merely through VFTs.

The technical solution of the embodiment of this invention is suitable for the need of bulk power grid interconnection, which integrates and incorporates the flexible adjustment capability of the newly developed networking device, i.e., VFT with system mode recognition and analyzing functions based on the Prony method; and researches and proposes a damping control scheme for low frequency power oscillation adaptive to dynamic variations in the structure and parameters of a power system. In this disclosure, the VFT modulates the transmission power, provides a dynamic excitation signal, and suppresses low frequency oscillation of the system through power adjustment; response characteristics of the cross-section power under a disturbance, including a dominant oscillation mode and its damping ratio, are analyzed based on the Prony method, to provide a basis for the design of the damping controller; a damping parameter optimization unit uses the above mentioned low frequency oscillation parameters to automatically optimize the parameters of the damping controller for the use in the system after verification.

Various embodiments of this invention have been described in a progressive manner, wherein each embodiment has emphases different to other embodiments. A mutual reference can be made to various embodiments for the same or similar portions thereof. With respect to the baseband processor chip and the terminal, due to the correspondence to the method embodiments thereof, only a simple description is given, refer to those method embodiments for related portions.

Those skilled in the art may understand that all or parts of method steps of the above embodiments can be implemented by hardware relevant program instruments, which can be stored in a computer readable storage medium, when executing the program executes the steps of the above method embodiments; the above storage medium comprises: ROM, RAM, magnetic disk or optical disk, and any other medium on which program code can be stored.

The description above is merely some preferable embodiments of this invention, and is any way not limiting to this invention. Although some preferable embodiments of this invention have been disclosed above, they are not limiting to this invention. Any skilled in the art may make many changes and modifications or equivalents through utilizing the methods and technical content disclosed above without departing from the scope of this invention. Thus, any changes, equivalents, or modifications to the above embodiments according to the subject matter of this invention fall within the protection scope of this invention as not departing from the content of the technical solution of this invention.

What is claimed is:

1. A method for suppressing low frequency oscillation in a power system, comprising:
    determining, by at least one processor, a system transfer function at a cross-section of the interconnected power system where a variable frequency transformer (VFT) locates;
    determining, by the at least one processor, damping controller parameters according to the system transfer function; and
    suppressing, by the VFT, low frequency oscillation in the power system based on the damping controller parameters,
    wherein determining a system transfer function at a cross-section of the interconnected power system comprises:
        applying, by the VFT, a power disturbance at the cross-section of the interconnected power system where the VFT locates;
        measuring, by the at least one processor, a power response under the power disturbance at the cross-section of the interconnected power system where the VFT locates; and
        determining, by the at least one processor, the system transfer function using a Prony method according to the power response.

2. The method for suppressing low frequency oscillation in a power system according to claim 1, wherein applying a power disturbance at the cross-section of the interconnected power system where the VFT locates comprises:
    applying, by the VFT, a square-wave power disturbance at the cross-section of the interconnected power system where the VFT locates.

3. The method for suppressing low frequency oscillation in a power system according to claim 1, wherein determining damping controller parameters according to the system transfer function comprises:
    determining, by the at least one processor, the damping controller parameters according to the system transfer function using a root locus method and phase compensation method.

4. The method for suppressing low frequency oscillation in a power system according to claim 1, wherein after determining the damping controller parameters, the method further comprises:
    applying, by the VFT, a power disturbance at the cross-section of the interconnected power system with parallel AC line(s) where the VFT locates to optimize the damping controller parameters.

5. The method for suppressing low frequency oscillation in a power system according to claim 1, wherein determining damping controller parameters according to the system transfer function comprises:
    performing, by the at least one processor, DC-blocking and phase lead/lag compensation.

6. A system for suppressing low frequency oscillation in a power system, comprising: at least one processor and a variable frequency transformer (VFT),
    wherein the at least one processor is configured to:
        determine a system transfer function at a cross-section of the interconnected power system where the VFT locates; and
        determine damping controller parameters according to the system transfer function,
    wherein the VFT is configured to:
        apply a power disturbance at the cross-section of the interconnected power system where the VFT locates; and
        suppress low frequency oscillation in the power system based on the damping controller parameters, and
    wherein the at least one processor is further configured to:
        measure a power response under the power disturbance at the cross-section of the interconnected power system where the VFT locates; and
        determine the system transfer function using a Prony method according to the power response.

7. The system for suppressing low frequency oscillation in a power system according to claim 6, wherein the VFT is configured to apply a square-wave power disturbance with parallel AC lines at the cross-section of the interconnected power system where the VFT locates.

8. The system for suppressing low frequency oscillation in a power system according to claim 6, wherein the at least one processor is configured to determine damping controller parameters according to the system transfer function using a root locus method and phase compensation method.

9. The system for suppressing low frequency oscillation in a power system according to claim 6,
wherein the VFT is configured to apply a power disturbance at the cross-section of the interconnected power system with parallel AC lines where the VFT locates to optimize the damping controller parameters.

10. The system for suppressing low frequency oscillation in a power system according to claim 6, wherein the at least one processor is configured to perform DC-blocking module and phase lead/lag compensation.

11. A method for suppressing low frequency oscillation in a power system, comprising:
determining, by at least one processor, a system transfer function at a cross-section of the interconnected power system where a variable frequency transformer (VFT) locates;
determining, by the at least one processor, damping controller parameters according to the system transfer function;
suppressing, by the VFT, low frequency oscillation in the power system based on the damping controller parameters,
wherein determining a system transfer function at a cross-section of the interconnected power system comprises:
applying, by the VFT, a square-wave power disturbance at the cross-section of the interconnected power system where the VFT locates; and
measuring, by the at least one processor, a power response under the power disturbance at the cross-section of the interconnected power system where the VFT locates.

12. A method for suppressing low frequency oscillation in a power system, comprising:
determining, by at least one processor, a system transfer function at a cross-section of the interconnected power system where a variable frequency transformer (VFT) locates;
determining, by the at least one processor, damping controller parameters according to the system transfer function using a root locus method and phase compensation method;
suppressing, by the VFT, low frequency oscillation in the power system based on the damping controller parameters.

13. A system for suppressing low frequency oscillation in a power system, comprising: at least one processor and a variable frequency transformer (VFT),
wherein the at least one processor is configured to:
determine a system transfer function at a cross-section of the interconnected power system where the VFT locates; and
determine damping controller parameters according to the system transfer function,
wherein the VFT is configured to:
apply a square-wave power disturbance with parallel AC lines at the cross-section of the interconnected power system where the VFT locates; and
suppress low frequency oscillation in the power system based on the damping controller parameters, and
wherein the at least one processor is further configured to:
measure a power response under the power disturbance at the cross-section of the interconnected power system where the VFT locates.

14. A system for suppressing low frequency oscillation in a power system, comprising: at least one processor and a variable frequency transformer (VFT),
wherein the at least one processor is configured to:
determine a system transfer function at a cross-section of the interconnected power system where the VFT locates; and
determine damping controller parameters according to the system transfer function using a root locus method and phase compensation method,
wherein the VFT is configured to:
suppress low frequency oscillation in the power system based on the damping controller parameters.

* * * * *